United States Patent

Shibata

(10) Patent No.: US 9,045,133 B2
(45) Date of Patent: Jun. 2, 2015

(54) VEHICLE TRAVEL CONTROL DEVICE

(75) Inventor: Takeo Shibata, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 252 days.

(21) Appl. No.: 13/818,582

(22) PCT Filed: Sep. 1, 2011

(86) PCT No.: PCT/JP2011/069961
§ 371 (c)(1),
(2), (4) Date: May 1, 2013

(87) PCT Pub. No.: WO2012/043132
PCT Pub. Date: Apr. 5, 2012

(65) Prior Publication Data
US 2013/0211652 A1    Aug. 15, 2013

(30) Foreign Application Priority Data

Sep. 29, 2010 (JP) ................................. 2010-218054

(51) Int. Cl.
*G06F 17/00* (2006.01)
*B60W 20/00* (2006.01)
(Continued)

(52) U.S. Cl.
CPC ................ *B60W 20/10* (2013.01); *B60K 6/48* (2013.01); *B60K 31/00* (2013.01);
(Continued)

(58) Field of Classification Search
CPC ..... B60W 20/10; B60W 10/06; B60W 10/08; B60W 20/00; B60W 30/14; B60W 2710/105; B60W 2720/10; B60W 2720/106; B60W 30/16; B60K 6/48; B60K 31/00; B60K 2031/0033; B60L 11/14; B60L 2240/12; B60L 15/20; B60L 2220/46; B60L 2240/423; B60L 2250/10; B60L 2260/28; Y02T 10/6221; Y02T 10/6286; Y02T 10/7077; Y02T 10/642; Y02T 10/7275; Y02T 10/70; Y10S 903/93
See application file for complete search history.

(56) References Cited

U.S. PATENT DOCUMENTS 5,465,208 A * 11/1995 Mochizuki et al. ............. 701/70
5,795,266 A *  8/1998 Hasegawa et al. ............ 477/169
(Continued)

FOREIGN PATENT DOCUMENTS

| JP | 2000-085406 A | 3/2000 |
| JP | 2001-248477 A | 9/2001 |
| JP | 2008-062894 A | 3/2008 |

OTHER PUBLICATIONS

International Search Report received in PCT/JP2011/069961 dated Nov. 15, 2011.

*Primary Examiner* — Mary Cheung
(74) *Attorney, Agent, or Firm* — Foley & Lardner LLP (57) ABSTRACT

Provided is a vehicle travel control device that outputs a driving force command requested for a target by a driving force source, to vehicles having different driving schemes without changing a driving force command calculation method even when the driving force command requested by the driving force source has a different target. The vehicle travel control device includes a target acceleration computation section for calculating a target acceleration in accordance with a calculated target vehicle speed and with a detected actual vehicle speed, and a driving force computation section for calculating a driving force command from the target acceleration and outputting the calculated driving force command. The driving force computation section outputs at least one of a plurality of driving force commands, which are converted by using a plurality of predetermined conversion ratios, in accordance with a connected driving force source.

7 Claims, 4 Drawing Sheets

(51) Int. Cl.
  *B60K 6/48*   (2007.10)
  *B60K 31/00*  (2006.01)
  *B60L 11/14*  (2006.01)
  *B60W 10/06*  (2006.01)
  *B60W 10/08*  (2006.01)
  *B60W 30/14*  (2006.01)
  *B60W 30/16*  (2012.01)
  *B60L 15/20*  (2006.01)

(52) U.S. Cl.
  CPC ........ *B60K 2031/0033* (2013.01); *B60L 11/14* (2013.01); *B60L 2240/12* (2013.01); *B60W 10/06* (2013.01); *B60W 10/08* (2013.01); *B60W 20/00* (2013.01); *B60W 30/14* (2013.01); *B60W 2710/105* (2013.01); *B60W 2720/10* (2013.01); *B60W 2720/106* (2013.01); *Y02T 10/6221* (2013.01); *Y02T 10/6286* (2013.01); *Y02T 10/7077* (2013.01); *B60W 30/16* (2013.01); *Y10S 903/93* (2013.01); *B60L 15/20* (2013.01); *B60L 2220/46* (2013.01); *B60L 2240/423* (2013.01); *B60L 2250/10* (2013.01); *B60L 2260/28* (2013.01); *Y02T 10/642* (2013.01); *Y02T 10/7275* (2013.01); *Y02T 10/70* (2013.01)

(56) References Cited

U.S. PATENT DOCUMENTS

| | | | | |
|---|---|---|---|---|
| 6,066,070 | A * | 5/2000 | Ito et al. | 477/43 |
| 6,190,283 | B1 * | 2/2001 | Uchida | 477/5 |
| 6,385,529 | B1 * | 5/2002 | Minowa et al. | 701/96 |
| 6,389,347 | B1 * | 5/2002 | Nozaki | 701/54 |
| 2005/0143221 | A1 * | 6/2005 | Kuwahara et al. | 477/97 |
| 2007/0208478 | A1 * | 9/2007 | Takamatsu | 701/53 |
| 2008/0243351 | A1 * | 10/2008 | Isogai et al. | 701/96 |
| 2009/0118958 | A1 * | 5/2009 | Abe | 701/70 |
| 2009/0125199 | A1 * | 5/2009 | Kaigawa | 701/54 |

* cited by examiner

VEHICLE TRAVEL CONTROL DEVICE

CROSS REFERENCE TO RELATED APPLICATIONS

The present application is a National Stage of International Application No. PCT/JP2011/069961 filed on Sep. 1, 2011, which claims the benefit of Japanese Patent Application No. 2010-218054 filed on Sep. 29, 2010. The entire disclosures of which are incorporated herein by reference.

TECHNICAL FIELD

The present invention relates to a vehicle travel control device mounted on a hybrid vehicle.

BACKGROUND ART

There is a known control device for a hybrid vehicle that includes an internal combustion engine and an electric motor as a driving source and travels by transmitting the driving force of either the internal combustion engine or the electric motor to a drive wheel. This control device sets the driving force required for the internal combustion engine and the driving force required for the electric motor in accordance with the operating status of the vehicle (Patent Document 1).

Also known is a vehicle travel control device that is used in the above-described hybrid vehicle control device to provide travel control of the vehicle in accordance with a vehicle speed and inter-vehicle distance arbitrarily set by a driver of the vehicle. This vehicle travel control device can control the acceleration and deceleration of the vehicle in order to follow a preceding vehicle.

PRIOR ART LITERATURE

Patent Document

Patent Document 1: JP-2008-62894-A

SUMMARY OF THE INVENTION

Problem to be Solved by the Invention

When the vehicle has a plurality of different driving force sources, a driving scheme adopted by the vehicle varies with the combination of driving force sources. In a case where a certain driving scheme is adopted, no rotation part is found as the target of a driving force command of a conventional vehicle travel control device.

In another case, the rotation part handled as the target of the driving force command, which a driving force source requests from the vehicle travel control device, may change. In these cases, the vehicle travel control device must change the method of calculating the driving force command and output to the driving force source the driving force command for the rotation part, which is a target for which the driving force command is to be requested.

An object of the present invention is to provide a vehicle travel control device that outputs a driving force command requested for a target by a driving force source, to vehicles having different driving schemes without changing the driving force command calculation method even when the driving force command requested by the driving force source has a different target.

Means for Solving the Problem

In accomplishing the above object, according to an aspect of the present invention, there is provided a vehicle travel control device including a target acceleration computation section and a driving force computation section. The target acceleration computation section calculates a target acceleration in accordance with a calculated target vehicle speed and with a detected actual vehicle speed. The driving force computation section calculates a driving force command from the target acceleration and outputs the calculated driving force command. The driving force computation section includes adjustment means, first conversion means, second conversion means, and output means. The adjustment means adjusts a target engine driving force calculated from the target acceleration in accordance with memorized vehicle characteristics and calculates a first driving force command. The first conversion means converts the first driving force command to a second driving force command in accordance with a predetermined first conversion ratio. The second conversion means converts the second driving force command to a third driving force command in accordance with a predetermined second conversion ratio. The output means outputs at least one of the first, second, and third driving force commands in accordance with a connected driving force source.

Effects of the Invention

The present invention makes it possible to provide a vehicle travel control device that outputs a driving force command requested for a target by a driving force source, to vehicles having different driving schemes without changing the driving force command calculation method even when the driving force command requested by the driving force source has a different target.

MODE FOR CARRYING OUT THE INVENTION

An embodiment of the present invention will now be described with reference to the accompanying drawings.

Figure 1:
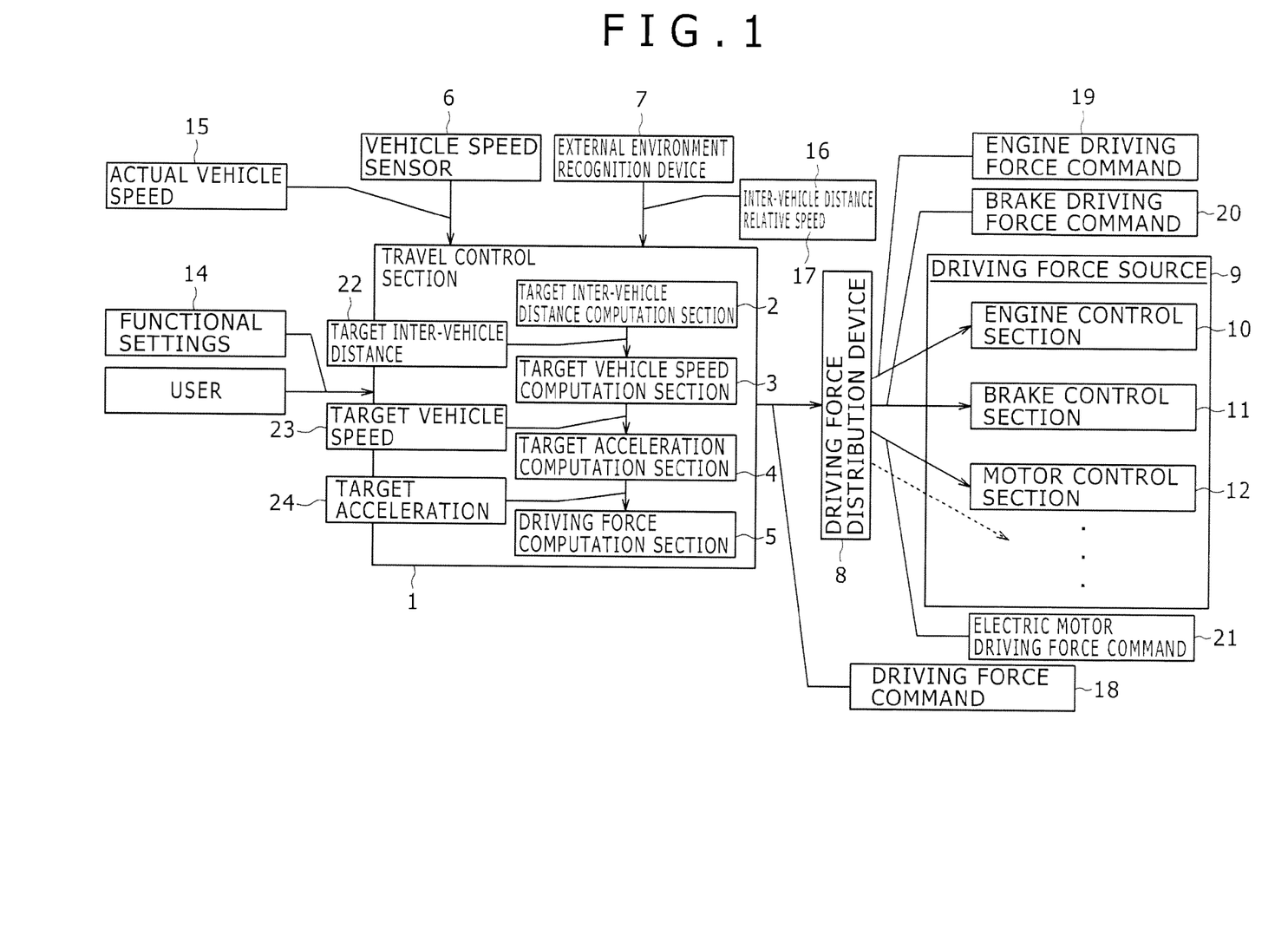
FIG. 1 is a schematic diagram illustrating the configuration of an embodiment of a vehicle travel control device according to the present invention.

FIG. 1 is a schematic diagram illustrating the configuration of a vehicle travel control device according to the present embodiment.

The vehicle travel control device is mounted on an automobile or other vehicle. As shown in FIG. 1, the vehicle travel control device mainly includes a travel control section 1, a vehicle speed sensor 6, an external environment recognition device 7, a driving force distribution device 8, and a driving force source 9 (an engine control section 10, a brake control section 11, and an electric motor control section 12).

The travel control section 1 is configured in an in-vehicle control unit that controls the travel of an automobile. When a memorized program is executed, the travel control section 1 implements the internal functions of a target inter-vehicle distance computation section 2, a target vehicle speed computation section 3, a target acceleration computation section 4, and a driving force computation section 5.

Travel control by the travel control section 1 can be either enabled or disabled automatically or in accordance with a user operation.

A user (driver) selects functional settings 14 (e.g., travel control mode, vehicle speed setting, and inter-vehicle distance setting) for travel control purposes. Various travel control modes are selectable. More specifically, the user can select, for example, a travel control mode (ACC (Adaptive Cruise Control) mode) that provides control over acceleration and deceleration of the vehicle to follow a preceding vehicle, a travel control mode that provides control over deceleration alone and accelerates the vehicle in accordance with a user operation, and a travel control mode that does not provide control over acceleration or deceleration but issues a warning to alert the user of an approaching preceding vehicle or obstacle. The vehicle speed setting can be increased or decreased in units, for instance, of 1 kilometer per hour. The inter-vehicle distance, which specifies the distance to a preceding vehicle, can be increased or decreased in units, for instance, of 10 meters.

The vehicle speed sensor 6 is a sensor that measures the traveling speed of the vehicle (actual vehicle speed 15). The vehicle speed sensor 6 is configured so that the travel control section 1 acquires information about the measured traveling speed. The external environment recognition device 7 includes imaging means (e.g., camera) for acquiring an image ahead of the vehicle and object detection means (e.g., radar) for detecting an object ahead (preceding vehicle or obstacle). As regards a preceding vehicle traveling ahead of the local vehicle or an object stopped ahead of the local vehicle, the external environment recognition device 7 calculates an inter-vehicle distance 16 (the distance to the preceding vehicle or to the object) and a relative speed 17 and outputs information about the calculated inter-vehicle distance 16 and relative speed 17 to the travel control section 1. The travel control section 1 then acquires the information. The inter-vehicle distance 16 and relative speed 17 may be acquired by one unit of the external environment recognition device 7 or by a plurality of units of the external environment recognition device 7.

The target vehicle speed computation section 3 calculates a target vehicle speed 23 in accordance with the functional settings 14 by a user operation, the actual vehicle speed 15 acquired from the vehicle speed sensor 6, the inter-vehicle distance 16 and relative speed 17 acquired from the external environment recognition device 7, and a target inter-vehicle distance 22 acquired from the target inter-vehicle distance computation section 2. The target acceleration computation section 4 calculates a target acceleration 24 that decreases the difference between the actual vehicle speed 15 and the target vehicle speed 23 calculated by the target vehicle speed computation section 3, and outputs the calculated target acceleration 24 to the driving force computation section 5.

The driving force computation section 5 calculates a driving force command 18 from the calculated target acceleration 24 in accordance with a vehicle weight and a driving force transmission configuration based on a plurality of conversion ratios (differential gear ratio, gear ratio, torque controller ratio, etc.), and outputs the calculated driving force command 18 to the driving force distribution device 8.

In accordance with the driving force command 18 calculated by the travel control section 1, the driving force distribution device 8 outputs an engine driving force command 19 to the engine control section 10, a brake driving force command 20 to the brake control section 11, and an electric motor driving force command 21 to the electric motor control section 12.

The engine control section 10 controls the acceleration of the vehicle by controlling the output of an engine in accordance with the engine driving force command 19 from the driving force distribution device 8. The brake control section 11 controls the deceleration of the vehicle by braking the vehicle in accordance with the brake driving force command 20 from the driving force distribution device 8. The electric motor control section 12, which functions as an electric motor and as a power generator, controls the acceleration and deceleration of the vehicle in accordance with the electric motor driving force command 21 from the driving force distribution device 8.

A method of calculating the driving force command 18, which is output from the travel control section 1 according to the present embodiment, will now be described with reference to the flowchart of FIG. 2 and a driving force transmission configuration diagram of FIG. 3. FIG. 3 shows a driving scheme that uses the engine 42 as the driving force source 9.

Figure 2:
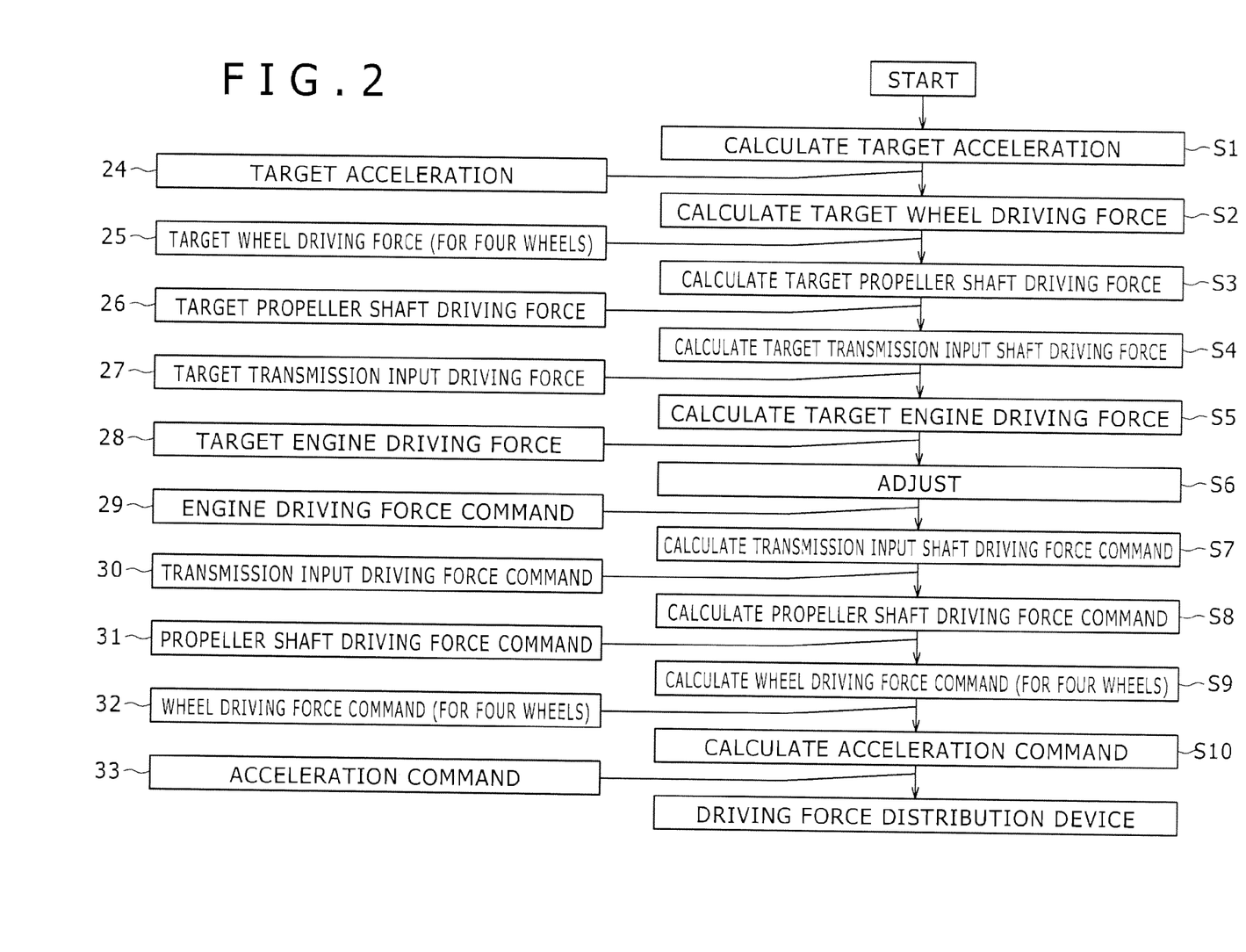
FIG. 2 is a flowchart illustrating how travel control is exercised by the vehicle travel control device according to the present invention.
Figure 3:
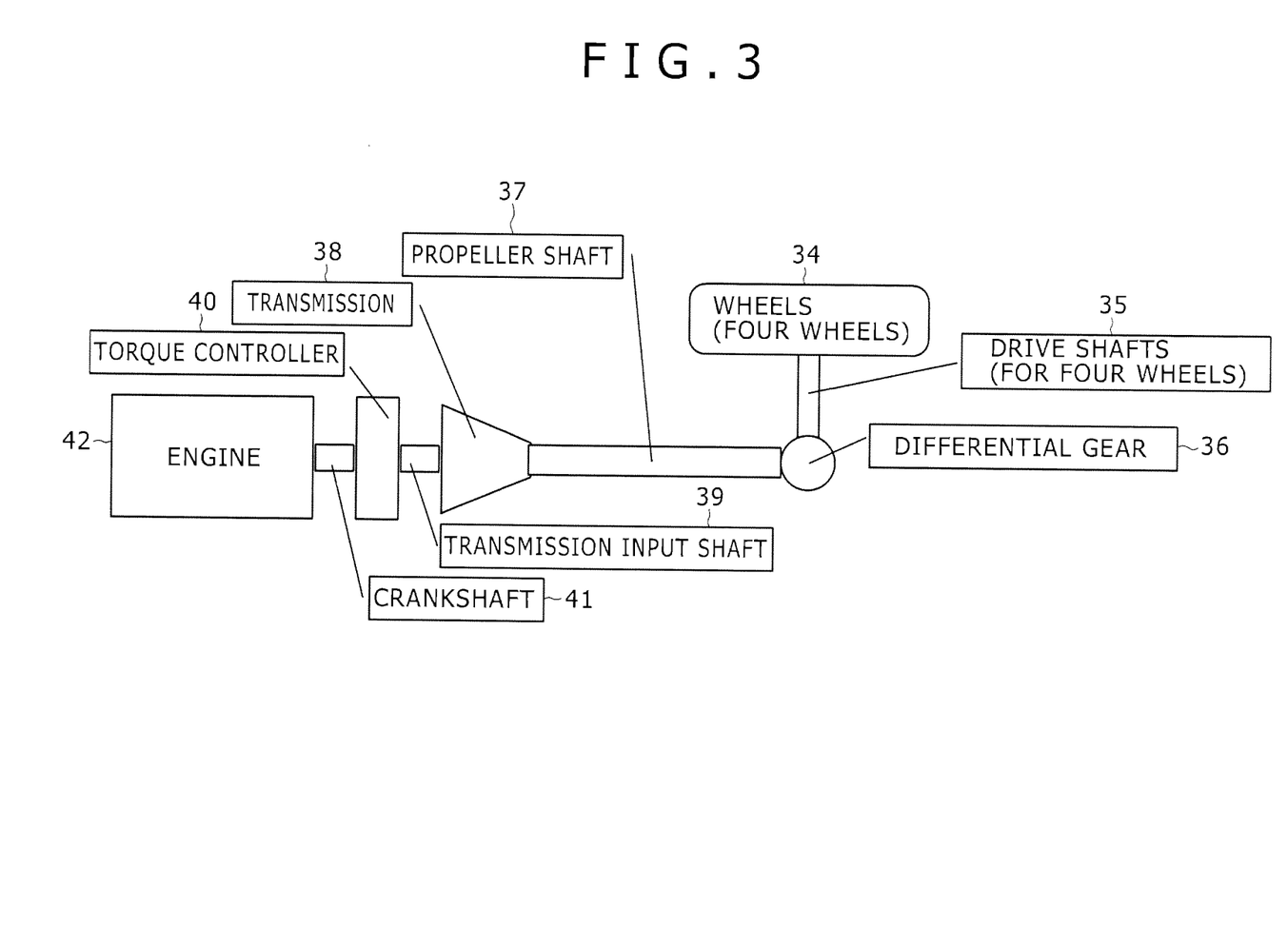
FIG. 3 is a diagram illustrating a driving scheme that uses an engine as a driving force source in the vehicle travel control device according to the present invention.

In step S1 of FIG. 2, the target acceleration computation section 4 in the travel control section 1 calculates the target acceleration 24.

In step S2 of FIG. 2, a target wheel driving force (for four wheels) 25 is calculated by multiplying the target acceleration 24, which is calculated by the target acceleration computation section 4, by a memorized vehicle weight of the local vehicle as indicated in Equation (1). The target wheel driving force (for four wheels) 25 is a target driving force for wheels (four wheels) 34 or drive shafts (for four wheels) 35 shown in FIG. 3.

$$\text{(Target wheel driving force)}=\text{(target acceleration)}\times\text{(vehicle weight)} \quad (1)$$

In step S3 of FIG. 2, a target propeller shaft driving force 26 is calculated by dividing the target wheel driving force (for four wheels) 25, which is calculated in step S2, by a memorized differential gear ratio as indicated in Equation (2). The target propeller shaft driving force 26 is a target driving force for a propeller shaft 37 shown in FIG. 3. The differential gear ratio indicated in Equation (2) is a ratio at which a differential gear 36 shown in FIG. 3 transmits a driving force from the propeller shaft 37 shown in FIG. 3 to the drive shafts (for four wheels) 35 shown in FIG. 3.

$$\text{(Target propeller shaft driving force)}=\text{(target wheel driving force)}/\text{(differential gear ratio)} \quad (2)$$

In step S4, a target transmission input driving force 27 is calculated by dividing the target propeller shaft driving force 26, which is calculated in step S3, by a memorized gear ratio as indicated in Equation (3). The target transmission input driving force 27 is a target driving force for a transmission input shaft 39 shown in FIG. 3. The gear ratio indicated in Equation (3) is a ratio at which a driving force is transmitted from a transmission 38 shown in FIG. 3 to the propeller shaft 37 shown in FIG. 3.

$$\text{(Target transmission input driving force)}=\text{(target propeller shaft driving force)}/\text{(gear ratio)} \quad (3)$$

In step S5, a target engine driving force 28 is calculated by dividing the target transmission input driving force 27, which is calculated in step S4, by a memorized torque controller ratio as indicated in Equation (4). The target engine driving force 28 is a target driving force for a crankshaft 41 shown in FIG. 3. The torque controller ratio indicated in Equation (4) is a ratio at which a driving force is transmitted from the crankshaft 41 shown in FIG. 3 to the transmission input shaft 39 shown in FIG. 3.

(Target engine driving force)=(target transmission input driving force)/(torque controller ratio) (4)

In step S6, adjustment means calculates an engine driving force command 29, which is a first driving force command, by adjusting the target engine driving force 28 in accordance with memorized vehicle characteristics. The engine driving force command 29 is a driving force command for the crankshaft 41 shown in FIG. 3. The vehicle characteristics are, for example, the vehicle weight, the radius of a tire, and the speed of vehicle operation response to at least one driving force command value.

In step S7, a transmission input driving force command 30, which is a second driving force command, is calculated by multiplying the engine driving force command 29, which is the first driving force command calculated in step S6, by the memorized torque controller ratio, which is a first conversion ratio, as indicated in Equation (5). The transmission input driving force command 30 is a driving force command for the transmission input shaft 39 shown in FIG. 3. The torque controller ratio indicated in Equation (5) is the same as the torque controller ratio indicated in Equation (4).

(Transmission input driving force command)=(engine driving force command)×(torque controller ratio) (5)

In step S8, a propeller shaft driving force command 31, which is a third driving force command, is calculated by multiplying the transmission input driving force command 30, which is the second driving force command calculated in step S7, by the memorized gear ratio, which is a second conversion ratio, as indicated in Equation (6). The propeller shaft driving force command 31 is a driving force command for the propeller shaft 37 shown in FIG. 3. The gear ratio indicated in Equation (6) is the same as the gear ratio indicated in FIG. 3.

(Propeller shaft driving force command)=(transmission input driving force command)×(gear ratio) (6)

In step S9, a wheel driving force command (for four wheels) 32, which is a fourth driving force command, is calculated by multiplying the propeller shaft driving force command 31, which is the third driving force command calculated in step S8, by the memorized differential gear ratio, which is a third conversion ratio, as indicated in Equation (7). The wheel driving force command (for four wheels) 32 is a driving force command for the wheels (four wheels) 34 or drive shafts (for four wheels) 35 shown in FIG. 3. The differential gear ratio indicated in Equation (7) is the same as the differential gear ratio indicated in Equation (2).

(Wheel driving force command)=(propeller shaft driving force command)×(differential gear ratio) (7)

In step S10, an acceleration command 33, which is a fifth driving force command, is calculated by dividing the wheel driving force command (for four wheels) 32, which is the fourth driving force command calculated in step S9, by the memorized vehicle weight as indicated in Equation (8). The vehicle weight indicated in Equation (8) is the same as the vehicle weight indicated in Equation (1).

(Acceleration command)=(wheel driving force command)/(vehicle weight) (8)

The above-mentioned torque controller ratio, gear ratio, and differential gear ratio are regarded as the first conversion ratio, the second conversion ratio, and the third conversion ratio, respectively. However, they are not specifically identified as such. Alternatively, for example, the differential gear ratio may be regarded as the second conversion ratio.

The same also holds true for a plurality of driving force commands such as the above-mentioned first to fifth driving force commands.

Details of the embodiment of the vehicle travel control device will now be described.

First of all, when, in a vehicle having a driving scheme that uses the engine 42 as the driving force source 9 as shown in FIG. 3, the driving force distribution device 8 requests the engine driving force command 29 from the travel control section 1, the output means of the driving force computation section 5 outputs the engine driving force command 29, which is calculated in step S6 of FIG. 2, to the driving force distribution device 8 as the driving force command 18.

When the driving force distribution device 8 requests the transmission input driving force command 30 from the travel control section 1, the output means of the driving force computation section 5 outputs the transmission input driving force command 30, which is calculated in step S7 of FIG. 2, to the driving force distribution device 8 as the driving force command 18.

When the driving force distribution device 8 requests the propeller shaft driving force command 31 from the travel control section 1, the output means of the driving force computation section 5 outputs the propeller shaft driving force command 31, which is calculated in step S8 of FIG. 2, to the driving force distribution device 8 as the driving force command 18.

When the driving force distribution device 8 requests the wheel driving force command (for four wheels) 32 from the travel control section 1, the output means of the driving force computation section 5 outputs the wheel driving force command (for four wheels) 32, which is calculated in step S9 of FIG. 2, to the driving force distribution device 8 as the driving force command 18.

When the driving force distribution device 8 requests the acceleration command 33 from the travel control section 1, the output means of the driving force computation section 5 outputs the acceleration command 33, which is calculated in step S10 of FIG. 2, to the driving force distribution device 8 as the driving force command 18.

Figure 4:
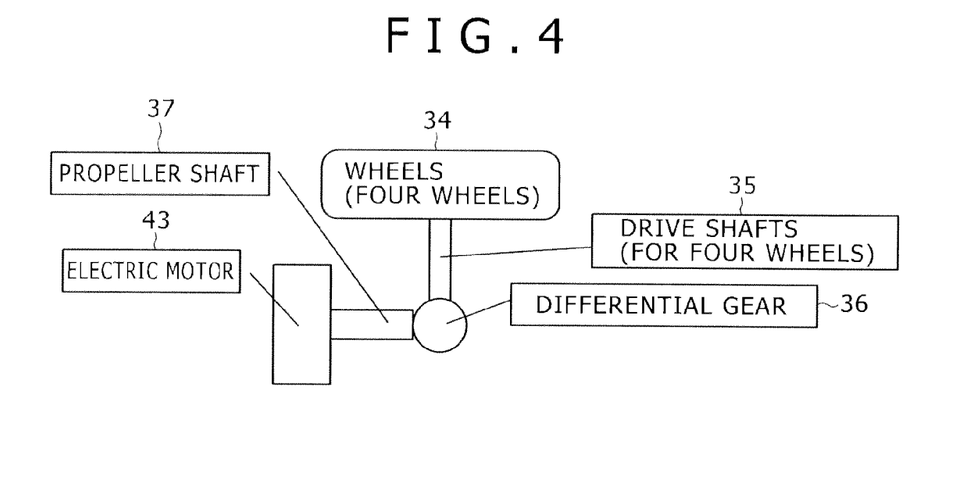
FIG. 4 is a diagram illustrating a driving scheme that uses an electric motor as a driving force source in the vehicle travel control device according to the present invention.

FIG. 4 shows a driving scheme that is not provided with an engine and uses an electric motor 43 as the driving force source 9. More specifically, FIG. 4 shows a vehicle that is not equipped with the transmission 38, transmission input shaft 39, torque controller 40, crankshaft 41, and engine 42 shown in FIG. 3 and is provided with the electric motor 43 connected to the propeller shaft 37.

When the driving force computation section 5 substitutes the value "1" for the gear ratio and for the torque controller ratio, the vehicle having the driving scheme shown in FIG. 4 virtually has the driving scheme shown in FIG. 3. When the travel control section 1 recognizes that the employed driving scheme connects the electric motor 43 as the driving force source 9, the driving force computation section 5 may be adapted to automatically set the gear ratio and torque controller ratio to "1". An alternative is to allow, for instance, the user to set the gear ratio and torque controller ratio to "1" from the outside. Therefore, the driving force commands indicated in steps S6 to S10 of FIG. 2 can be selected and output in accordance with the request of the driving force distribution device 8 irrespective of the actual driving scheme indicated in FIG. 4.

Figure 5:
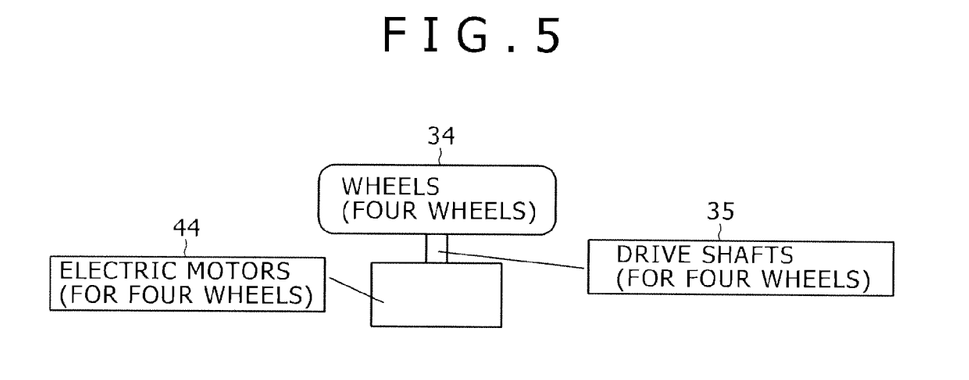
FIG. 5 is a diagram illustrating another driving scheme that uses an electric motor as a driving force source in the vehicle travel control device according to the present invention.

FIG. 5 shows a driving scheme in which electric motors (for four wheels) 44 are used as the driving force source 9 and the driving force of the driving force source 9 is equal to the driving force of the wheels (four wheels) 34 or of the drive shafts (for four wheels) 35. More specifically, FIG. 5 shows a vehicle in which the electric motors (for four wheels) 44 acting as the driving force source are connected to the wheels (four wheels) 34 through the drive shafts (for four wheels) 35.

When the driving force computation section 5 substitutes the value "3.5" for the differential gear ratio, the vehicle having the driving scheme shown in FIG. 5 virtually has the driving scheme shown in FIG. 4. In other words, when the driving force computation section 5 substitutes the value "1" for the gear ratio and for the torque controller ratio, and substitutes the value "3.5" for the differential gear ratio, the vehicle having the driving scheme shown in FIG. 5 virtually has the driving scheme shown in FIG. 3.

When the travel control section 1 recognizes that the employed driving scheme connects the driving force source 9 shown in FIG. 5, the driving force computation section 5 may be adapted to automatically set the gear ratio and torque controller ratio to "1" and the differential gear ratio to "3.5". An alternative is to allow, for instance, the user to set the gear ratio and torque controller ratio to "1" and the differential gear ratio to "3.5" from the outside.

Instead of the values "3.5" and "1", a value other than "0" may be substituted. In the present embodiment, the values "3.5" and "1" are substituted as examples. Any value other than "0" can be substituted because the substituted values offset each other in steps before and after step S6.

Consequently, the driving force commands for steps S6 to S10 of FIG. 2 can be selected and output in accordance with the request of the driving force distribution device 8 irrespective of the actual driving scheme indicated in FIG. 5.

More specifically, the driving force computation section 5 in the travel control section 1 shown in FIG. 1 can output the engine driving force command 29, the transmission input driving force command 30, the propeller shaft driving force command 31, the wheel driving force command (for four wheels) 32, or the acceleration command 33 as the driving force command 18 in accordance with the request of the driving force distribution device 8 and with the connected driving force sources 9.

For example, the driving force command that can be output when an engine automobile having a driving scheme for using an engine as the driving force source is used differs from the driving force command that can be output when an electric automobile having a driving scheme for using an electric motor as the driving force source is used. When a hybrid automobile having a driving scheme for using both an engine and an electric motor as the driving force source is used, a plurality of driving force commands can be output.

The vehicle travel control device according to the present invention, which has been described above, includes a target acceleration computation section 4 and a driving force computation section 5. The target acceleration computation section 4 calculates a target acceleration 24 in accordance with a calculated target vehicle speed 23 and with a detected actual vehicle speed 15. The driving force computation section 5 calculates a driving force command 18 from the target acceleration 24 and outputs the calculated driving force command 18. The driving force computation section 5 includes adjustment means, first conversion means, second conversion means, and output means. The adjustment means adjusts a target engine driving force 28 calculated from the target acceleration 24 in accordance with memorized vehicle characteristics and calculates a first driving force command. The first conversion means converts the first driving force command to a second driving force command in accordance with a predetermined first conversion ratio. The second conversion means converts the second driving force command to a third driving force command in accordance with a predetermined second conversion ratio. The output means outputs at least one of the first, second, and third driving force commands in accordance with a connected driving force source 9. When the employed configuration, which is described above, outputs at least one of a plurality of driving force commands, which are converted by using the predetermined conversion ratios in accordance with the connected driving force source 9, the configuration can be used without changing a driving force command calculation method even when the driving scheme is changed due to a change of the driving force source. Further, a conventional adjustment process can be used.

DESCRIPTION OF REFERENCE NUMERALS

1 . . . Travel control section
2 . . . Target inter-vehicle distance computation section
3 . . . Target vehicle speed computation section
4 . . . Target acceleration computation section
5 . . . Driving force computation section
6 . . . Vehicle speed sensor
7 . . . External environment recognition device
8 . . . Driving force distribution device
9 . . . Driving force source
10 . . . Engine control section
11 . . . Brake control section
12 . . . Electric motor control section
14 . . . Functional settings
15 . . . Actual vehicle speed
16 . . . Inter-vehicle distance
17 . . . Relative speed
18 . . . Driving force command
19 . . . Engine driving force command
20 . . . Brake driving force command
21 . . . Electric motor driving force command
22 . . . Target inter-vehicle distance
23 . . . Target vehicle speed
24 . . . Target acceleration

The invention claimed is:
1. A vehicle travel control device comprising:
a target acceleration computation section for calculating a target acceleration in accordance with a calculated target vehicle speed and with a detected actual vehicle speed; and
a driving force computation section for calculating a driving force command from the target acceleration and outputting the calculated driving force command;
wherein the driving force computation section includes
adjustment means for adjusting a target engine driving force calculated from the target acceleration in accordance with memorized vehicle characteristics and calculating a first driving force command,
first conversion means for converting the first driving force command to a second driving force command in accordance with a predetermined first conversion ratio,
second conversion means for converting the second driving force command to a third driving force command in accordance with a predetermined second conversion ratio, and
output means for outputting at least one of the first, second, and third driving force commands in accordance with a connected driving force source.

2. The vehicle travel control device according to claim 1,
wherein the driving force computation section further includes
third conversion means for converting the third driving force command to a fourth driving force command in accordance with a predetermined third conversion ratio, and
driving force command calculation means for calculating a fifth driving force command in accordance with the fourth driving force command and with a memorized vehicle weight; and
wherein the output means outputs at least one of the first, second, third, fourth, and fifth driving force commands in accordance with the connected driving force source.

3. The vehicle travel control device according to claim 2,
wherein the driving force computation section further includes
target wheel driving force calculation means for generating a target wheel driving force in accordance with the target acceleration and with a predetermined vehicle weight,
first driving force conversion means for converting the target wheel driving force to a first target driving force in accordance with the first conversion ratio,
second driving force conversion means for converting the first target driving force to a second target driving force in accordance with the second conversion ratio, and
third driving force conversion means for converting the second target driving force to a target engine driving force in accordance with the third conversion ratio.

4. The vehicle travel control device according to claim 1,
wherein the driving force computation section further includes
target wheel driving force calculation means for generating a target wheel driving force in accordance with the target acceleration and with a predetermined vehicle weight,
first driving force conversion means for converting the target wheel driving force to a first target driving force in accordance with the first conversion ratio, and
second driving force conversion means for converting the first target driving force to a target engine driving force in accordance with the second conversion ratio.

5. The vehicle travel control device according to claim 1,
wherein the vehicle characteristics are a memorized vehicle weight, a memorized tire radius, and a memorized speed of vehicle operation response to at least one driving force command value.

6. The vehicle travel control device according to claim 1,
wherein the driving force command output from the output means varies depending on whether the employed driving scheme connects an engine or an electric motor as a driving force source.

7. The vehicle travel control device according to claim 1,
wherein the output means outputs a plurality of driving force commands when the employed driving scheme connects both an engine and an electric motor as a driving force source.

* * * * *